United States Patent
Khamaisee et al.

(10) Patent No.: US 10,444,453 B1
(45) Date of Patent: Oct. 15, 2019

(54) QSFP-DD TO SFP-DD ADAPTER

(71) Applicant: Mellanox Technologies, Ltd., Yokneam (IL)

(72) Inventors: Assad Khamaisee, Kfar Kana (IL); Avraham Ganor, Shoham (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 16/044,520

(22) Filed: Jul. 25, 2018

(51) Int. Cl.
*G02B 6/42* (2006.01)
*H04B 10/80* (2013.01)
*H04B 10/40* (2013.01)

(52) U.S. Cl.
CPC ......... *G02B 6/4284* (2013.01); *G02B 6/4293* (2013.01); *H04B 10/40* (2013.01); *H04B 10/801* (2013.01)

(58) Field of Classification Search
CPC ... G02B 6/4284; G02B 6/4293; H04B 10/801
See application file for complete search history.

(56) References Cited

U.S. PATENT DOCUMENTS

| | | | |
|---|---|---|---|
| 4,968,260 | A | 11/1990 | Ingalsbe |
| 5,087,207 | A | 2/1992 | Byrne |
| 5,387,110 | A | 2/1995 | Kantner et al. |
| 5,664,950 | A | 9/1997 | Lawrence |
| 5,696,669 | A | 12/1997 | Bassler et al. |
| 5,734,558 | A | 3/1998 | Poplawski et al. |
| 5,766,020 | A | 6/1998 | Hughes |
| 5,788,521 | A | 8/1998 | Milan |
| 5,984,731 | A | 11/1999 | Laity |
| 6,183,307 | B1 | 2/2001 | Laity et al. |
| 6,183,308 | B1 | 2/2001 | Laity |
| 6,203,333 | B1 | 3/2001 | Medina et al. |
| 6,215,656 | B1 | 4/2001 | O'Neal et al. |
| 6,256,448 | B1 | 7/2001 | Shahid |
| 6,517,382 | B2 | 2/2003 | Flickinger et al. |
| 6,648,695 | B1 | 11/2003 | Wu |
| 6,773,291 | B1 | 8/2004 | Roth et al. |
| 6,814,593 | B2 | 11/2004 | Wang et al. |

(Continued)

FOREIGN PATENT DOCUMENTS

CN  205846322 U  12/2016

OTHER PUBLICATIONS

"Cisco 40GBASE QSFP+ Modules", Data sheet, 7 pages, Oct. 2012.

(Continued)

*Primary Examiner* — Sung H Pak
(74) *Attorney, Agent, or Firm* — Kligler & Associates

(57) ABSTRACT

An adapter includes an electrical male connector, an electrical female connector, an electronic circuit and one or more visual indicators. The electrical male connector is configured for plugging into a receptacle of a first electro-optical transceiver type having N signal lanes. The electrical female connector is configured to receive a male connector of a second electro-optical transceiver type having M signal lanes, M smaller than N. The electronic circuit is configured to route a partial subset of M signal lanes from among the N signal lanes, between the electrical male connector and the electrical female connector. One or more visual indicators are configured to display a status of one or more network ports mapped to one or more of the signal lanes in the partial subset.

11 Claims, 3 Drawing Sheets

(56) References Cited

U.S. PATENT DOCUMENTS

| | | | |
|---|---|---|---|
| 6,816,376 | B2 | 11/2004 | Bright et al. |
| 7,028,202 | B2 | 4/2006 | Long et al. |
| 7,048,550 | B2 | 5/2006 | Hayland et al. |
| 7,335,033 | B1 | 2/2008 | Edwards, Jr. et al. |
| 7,380,993 | B2 | 6/2008 | Dallesasse |
| 7,452,139 | B2 | 11/2008 | Wang et al. |
| 7,747,292 | B2 | 6/2010 | Mezer et al. |
| 7,823,041 | B2 | 10/2010 | Mezer et al. |
| 7,934,959 | B2 | 5/2011 | Rephaeli et al. |
| 8,083,417 | B2 | 12/2011 | Aronson et al. |
| 8,419,444 | B2 | 4/2013 | Kagan et al. |
| 8,599,559 | B1 | 12/2013 | Morrison et al. |
| 8,641,429 | B2 | 2/2014 | Fish et al. |
| 8,944,704 | B2 | 2/2015 | Lagziel et al. |
| D734,728 | S | 7/2015 | Lagziel et al. |
| 9,793,667 | B1 * | 10/2017 | Park ........................ H04B 1/38 |
| 2001/0019907 | A1 | 9/2001 | Glad et al. |
| 2004/0013369 | A1 | 1/2004 | Coffey et al. |
| 2004/0023559 | A1 | 2/2004 | Wu |
| 2007/0232132 | A1 | 10/2007 | Ling et al. |
| 2007/0237464 | A1 | 10/2007 | Aronson et al. |
| 2007/0237472 | A1 | 10/2007 | Aronson et al. |
| 2008/0044141 | A1 | 2/2008 | Willis et al. |
| 2008/0069052 | A1 | 3/2008 | Mezer et al. |
| 2008/0150546 | A1 | 6/2008 | Gale |
| 2008/0249470 | A1 | 10/2008 | Malave et al. |
| 2008/0267620 | A1 | 10/2008 | Cole et al. |
| 2009/0060425 | A1 | 3/2009 | Aronson et al. |
| 2009/0093137 | A1 | 4/2009 | Badehi et al. |
| 2009/0093166 | A1 | 4/2009 | Fogg et al. |
| 2009/0232151 | A1 | 9/2009 | Furlong et al. |
| 2009/0247006 | A1 | 10/2009 | Thompson |
| 2010/0014566 | A1 | 1/2010 | Mezer et al. |
| 2011/0123157 | A1 | 5/2011 | Belsan et al. |
| 2012/0015552 | A1 | 1/2012 | Diab et al. |
| 2012/0141132 | A1 * | 6/2012 | Walker .................. G06F 13/385 398/116 |
| 2013/0251052 | A1 | 9/2013 | Tang et al. |
| 2015/0092363 | A1 | 4/2015 | Blier et al. |
| 2015/0282382 | A1 | 10/2015 | Nguyen |

OTHER PUBLICATIONS

International Electrotechnical Commission, Standard IEC-61754-7, "Fibre optic interconnecting devices and passive components—Fibre optic connector interfaces—Part 7: Type MPO connector family", Edition 3.0, 32 pages, Mar. 2008.

International Electrotechnical Commission, Standard IEC-61754-5, "Fibre optic connector interfaces—Part 5: Type MT connector family", Edition 2.0, 32 pages, Jul. 2005.

Mellanox Technologies, "Quad to Serial Small Form Factor Pluggable Adapter: Enabling VPI/40GigE connectivity on 1/10GigE Infrastructure", 1 page, USA 2010.

SFF Committee, "SFF-8431 Specifications for Enhanced Small Form Factor Pluggable Module SFP+", Revision 4.1, 132 pages, Jul. 6, 2009.

SFF Committee, "SFF-8436 Specification for QSFP+ Copper and Optical Modules", Revision 3.4, 71 pages, Nov. 12, 2009.

SFF Committee, "INF-8438i Specification for QSFP (Quad Small Formfactor Pluggable) Transceiver", Revision 1.0, 75 pages, Nov. 2006.

Barrass et al, "10GBASE-T: 10 Gigabit Ethernet over Twisted-pair Copper", Ethernet Alliance, Version 1.0, Austin, USA, 44 pages, Aug. 2007.

Aquantia Corporation, Quad 10GBASE-T Product Brief, Version 1.0, Milpitas, USA, 2 pages, Apr. 23, 2009.

IEEE Standard 802.3an-2006, "IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment 1: Physical Layer and Management Parameters for 10 Gb/s Operation, Type 10GBASE-T", 181 pages, Sep. 1, 2006.

Solarflare Communications, Inc., "Solarflare SFN5122F Dual-Port 10G Ethernet Enterprise Server Adapter", Product Brief, 2 pages, year 2011.

Teranetics—PLX Technology, Inc., "Dual-Speed 10GBase-T / 1000 Base-T Ethernet Physical Layer Device", Product Brief, 3 pages, year 2010.

Kazav et al., U.S. Appl. No. 15/635,236, filed Jun. 28, 2017.

Cisco, "Cisco QSFP to SFP or SFP+ Adapter Module", 3 pages, Jun. 24, 2017.

Mellanox Technologies, "10Gb/s DynamiX QSATM QSFP+ to SFP+ Adapter", 3 pages, Feb. 8, 2018.

QSFP-DD MSA, "QSFP-DD Hardware Specification for QSFP Double Density 8X Pluggable Transceiver", Revision 3.0, 69 pages, Sep. 19, 2017.

SFP-DD MSA, "SFP-DD Hardware Specification for SFP Double Density 2X Pluggable Transceiver", Revision 1.1, 49 pages, Jan. 7, 2018.

Kazav et al., U.S. Appl. No. 16/154,746, filed Oct. 9, 2018.

OSFP "Frequently Asked Questions", 2 pages, May 15, 2017.

European Application # 18180210 search report dated Nov. 23, 2018.

* cited by examiner

US 10,444,453 B1

QSFP-DD TO SFP-DD ADAPTER

FIELD OF THE INVENTION

The present invention relates generally to electro-optical interconnects, and particularly to adapters for adapting between electro-optical connector types.

BACKGROUND OF THE INVENTION

Small Form Factor Pluggable Double Density (SFP-DD) and Quad Small Form Factor Pluggable Double Density (QSFP-DD) are compact, pluggable electro-optical transceiver systems specified by the SFP-DD and QSFP-DD Multi-Source Agreement (MSA) groups. SFP-DD transceivers support two differential signal lanes, whereas QSFP-DD transceivers support eight differential signal lanes. SFP-DD is backward compatible to SFP, and QSFP-DD is backward compatible to QSFP.

SFP-DD is specified, for example, in "SFP-DD MSA SFP-DD Hardware Specification for SFP Double Density 2× Pluggable Transceiver," Rev 1.1, Jan. 7, 2018, which is incorporated herein by reference. QSFP-DD is specified, for example, in "QSFP-DD MSA QSFP-DD Hardware Specification for QSFP Density 8× Pluggable Transceiver," Rev 3.0, Sep. 19, 2017, which is incorporated herein by reference.

SUMMARY OF THE INVENTION

An embodiment of the present invention that is described herein provides an adapter including an electrical male connector, an electrical female connector, an electronic circuit and one or more visual indicators. The electrical male connector is configured for plugging into a receptacle of a first electro-optical transceiver type having N signal lanes. The electrical female connector is configured to receive a male connector of a second electro-optical transceiver type having M signal lanes, M smaller than N. The electronic circuit is configured to route a partial subset of M signal lanes from among the N signal lanes, between the electrical male connector and the electrical female connector. One or more visual indicators are configured to display a status of one or more network ports mapped to one or more of the signal lanes in the partial subset.

In some embodiments, the first electro-optical transceiver type is Quad Small Form Factor Pluggable Double Density (QSFP-DD), and the second electro-optical transceiver type is Small Form Factor Pluggable Double Density (SFP-DD). In an embodiment, the partial subset consists of two SFP-DD signal lanes, and the one or more visual indicators include two visual indicators configured to display the status of two network ports mapped to the two SFP-DD signal lanes, respectively.

In another embodiment, the adapter further includes a mechanical shell that contains the male connector, the female connector and the electronic circuit. In yet another embodiment, the electronic circuit is configured to select the signal lanes in the partial subset, and to route the selected signal lanes between the electrical male connector and the electrical female connector.

There is additionally provided, in accordance with an embodiment of the present invention, an adapter including an electrical male connector, an electrical female connector and an electronic circuit. The electrical male connector is configured for plugging into a receptacle of a first electro-optical transceiver type having N signal lanes. The electrical female connector is configured to receive a male connector of a second electro-optical transceiver type having M signal lanes, M smaller than N. The electronic circuit is configured to select, from among the N signal lanes, a partial subset of M signal lanes, and to route the selected partial subset between the electrical male connector and the electrical female connector.

In some embodiments, the first electro-optical transceiver type is Quad Small Form Factor Pluggable Double Density (QSFP-DD), and the second electro-optical transceiver type is Small Form Factor Pluggable Double Density (SFP-DD). In a disclosed embodiment, selection of the partial subset is fixed. In an alternative embodiment, selection of the partial subset is configurable in the electronic circuit.

In an embodiment, the adapter further includes a mechanical shell that contains the male connector, the female connector and the electronic circuit. In an example embodiment, the adapter further includes one or more visual indicators, configured to display a status of one or more network ports mapped to one or more of the signal lanes in the partial subset.

There is also provided, in accordance with an embodiment of the present invention, a method for producing an adapter. The method includes providing an electrical male connector, configured for plugging into a receptacle of a first electro-optical transceiver type having N signal lanes, and providing an electrical female connector, configured to receive a male connector of a second electro-optical transceiver type having M signal lanes, M smaller than N. The electrical male connector and the electrical female connector are connected by an electronic circuit, configured to route a partial subset of M signal lanes from among the N signal lanes, between the electrical male connector and the electrical female connector. One or more visual indicators are coupled to the electronic circuit, for displaying a status of one or more network ports mapped to one or more of the signal lanes in the partial subset.

There is further provided, in accordance with an embodiment of the present invention, a method for producing an adapter. The method includes providing an electrical male connector, configured for plugging into a receptacle of a first electro-optical transceiver type having N signal lanes, and providing an electrical female connector, configured to receive a male connector of a second electro-optical transceiver type having M signal lanes, M smaller than N. The electrical male connector and the electrical female connector are connected by an electronic circuit, configured to select, from among the N signal lanes, a partial subset of M signal lanes, and to route the selected partial subset between the electrical male connector and the electrical female connector.

The present invention will be more fully understood from the following detailed description of the embodiments thereof, taken together with the drawings in which:

DETAILED DESCRIPTION OF EMBODIMENTS

Overview

Embodiments of the present invention that are described herein provide adapters that convert between the QSFP-DD form factor and the SFP-DD form factor.

In the disclosed embodiments, a QSFP-DD to SFP-DD adapter comprises a QSFP-DD plug (i.e., male connector), a SFP-DD receptacle (i.e., jack or female connector), and an electronic circuit that is configured, among other functions addressed below, to route two of the eight QSFP-DD differential signal lanes between the connectors.

An adapter of this sort is useful, for example, for connecting a QSFP-DD port (e.g., of a network switch) to a SFP-DD port (e.g., of a server). In a typical use-case, the adapter is plugged into the QSFP-DD port (e.g., on the switch), and a cable is plugged into the adapter for connecting to the SFP-DD port (e.g., on the server). When using the disclosed adapters, QSFP-DD ports and SFP-DD ports can be connected using commonly-used, low-cost and high-quality SFP-to-SFP or SFP-DD-to-SFP-DD cables. The disclosed adapters eliminate the need for hybrid QSFP-DD/SFP-DD cables, which are typically expensive and tend to have poor electrical performance.

In some embodiments, the adapter further comprises one or more visual indicators, for displaying a status of one or more of the signal lanes. In an example implementation, the adapter comprises two dual-color Light Emitting Diodes (LEDs), configured to display the status of the two SFP-DD ports routed by the adapter (each port being mapped over respective SFP-DD lane). Such visual indicators on the adapter are extremely useful, e.g., because they show the status of the SFP-DD port at the distant end of the cable. Without these indicators, a user would have to track the cable to its distant end, in order to identify the SFP-DD port the cable is plugged into, and check the port status there.

In some embodiments, the electronic circuit in the adapter is configured to select the specific subset of two differential signal lanes, from among the eight QSFP-DD lanes, and to route the selected subset between the QSFP-DD connector and the SFP-DD connector. In some embodiments the selection is fixed, e.g., hard-wired. In such embodiments, a different adapters can be produced for selecting different pairs of differential signal lanes. In other embodiments, the selection is configurable in the adapter.

Adapter Description

Figure 1:
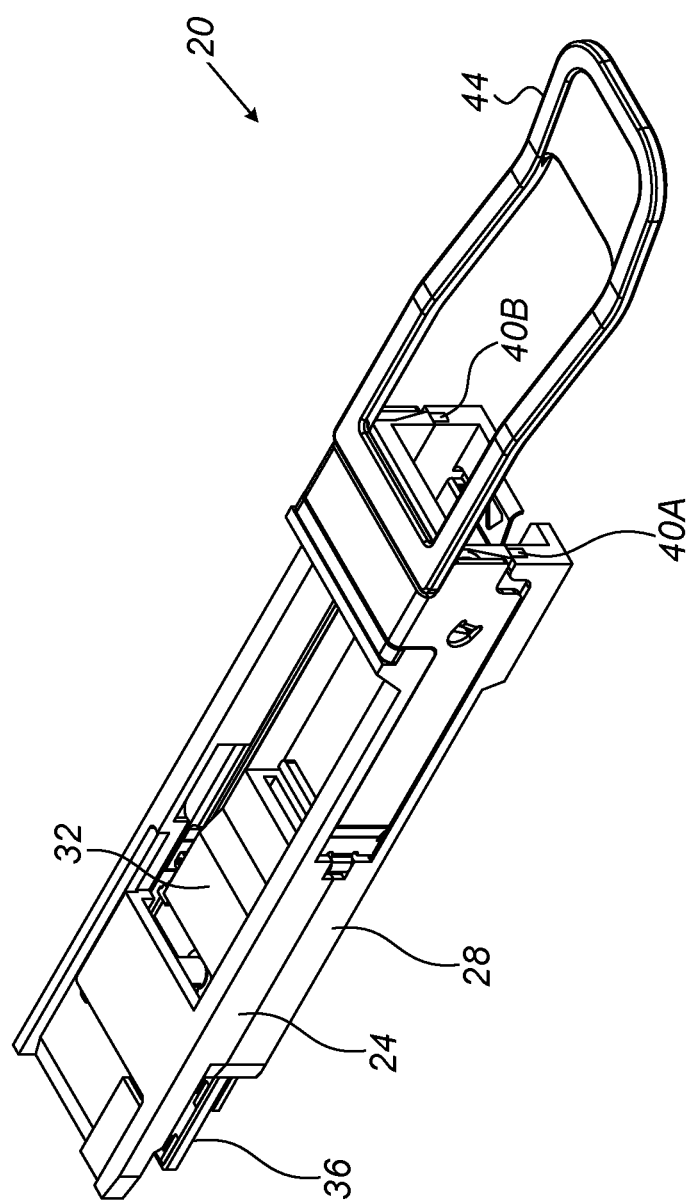
FIG. 1 is a schematic three-dimensional (3D) view of a QSFP-DD to SFP-DD adapter, in accordance with an embodiment of the present invention.

FIG. 1 is a schematic three-dimensional (3D) view of a QSFP-DD to SFP-DD adapter 20, in accordance with an embodiment of the present invention. Adapter 20 comprises a mechanical shell, in the present example made of a top backshell 24 and a bottom backshell 28. The adapter further comprises a female SFP-DD connector 32 and a Printed Circuit Board (PCB) 36. Circuit traces on PCB 36, and part of top backshell 24, together form a male QSFP-DD connector, designed to be plugged into a QSFP-DD receptacle (e.g., on the front panel of a network switch). Female SFP-DD connector 32 is designed to receive a SFP-DD plug (e.g., of a SFP-DD optical cable).

In accordance with the QSFP-DD and SFP-DD specifications, cited above, the QSFP-DD connector transfers eight differential signal lanes, and the SFP-DD connector transfers two differential signal lanes. In some embodiments, PCB 36 comprises an electronic circuit that selects two signal lanes from among the eight QSFP-DD signal lanes, and routes these two signal lanes to female SFP-DD connector 32.

As seen in FIG. 1, adapter 20 further comprises a pull tab 44, for unplugging the adapter from the QSFP-DD receptacle by a user.

In the embodiment of FIG. 1, adapter 20 comprises two LEDs (shown further below), which display status information pertaining to the two network ports that are mapped to the two SFP-DD lanes routed by adapter 20, respectively. The LEDs are mounted on PCB 36 and are driven by the electronic circuit on the PCB. The two LEDs are optically coupled to two respective LED pipes 40A and 40B. Each LED pipe guides the light from the respective LED to the front panel of adapter 20. The ends of LED pipes 40A and 40B can be seen in the figure, on the front panel of the adapter below pull tab 44. In alternative embodiments, any other suitable type and any other suitable number of visual indicators can be used.

Figure 2:
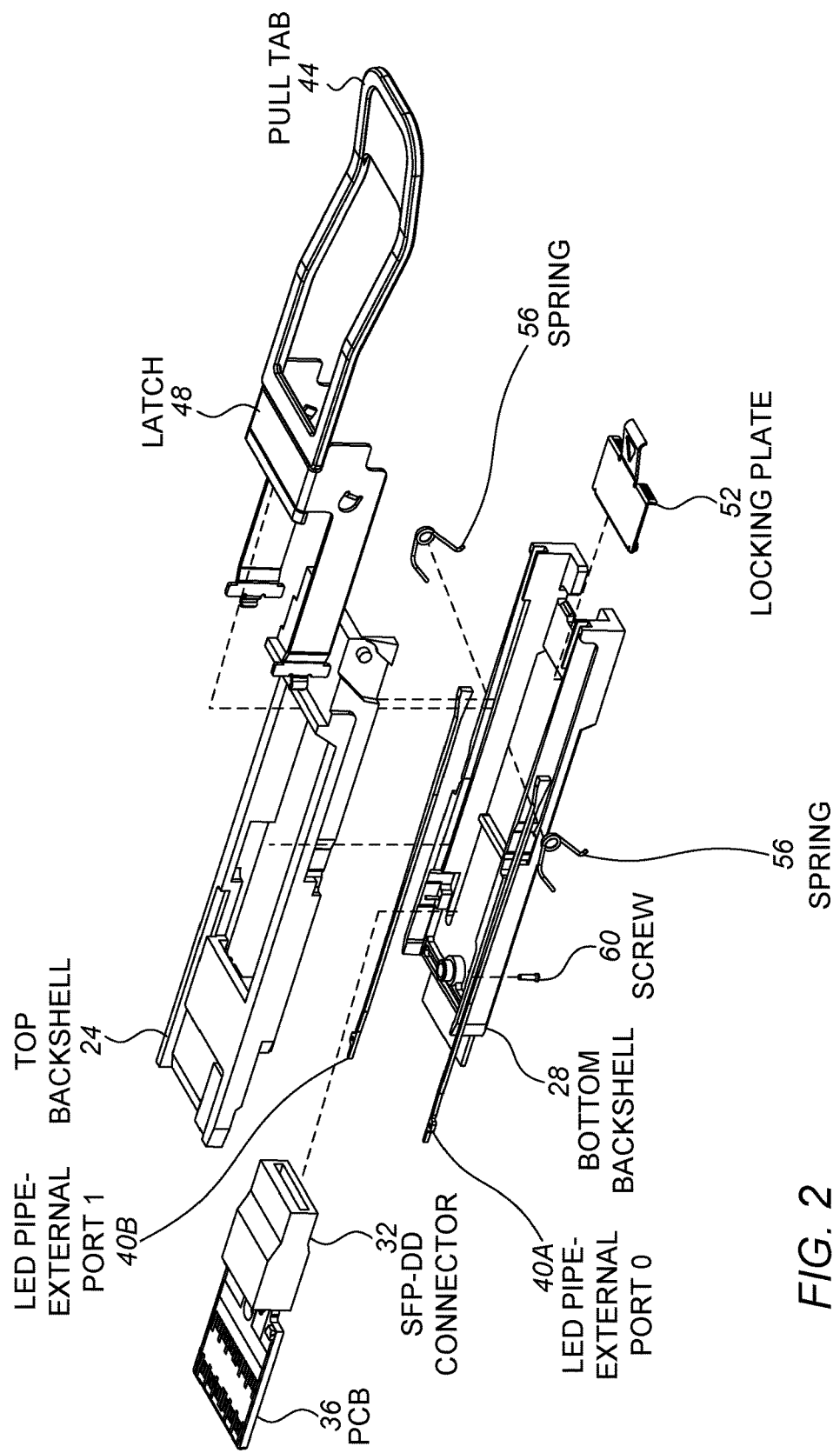
FIG. 2 is a schematic exploded view of the QSFP-DD to SFP-DD adapter, in accordance with an embodiment of the present invention.

FIG. 2 is a schematic, exploded view of QSFP-DD to SFP-DD adapter 20, in accordance with an embodiment of the present invention. The exploded view shows several additional mechanical elements of adapter 20, namely a latch 48, a locking plate 52 for locking the SFP-DD connector of the cable (not shown) in place, a pair of springs 56 that hold locking plate 52, and a screw 60 that connects top backshell 24 and bottom backshell 28.

Figure 3:
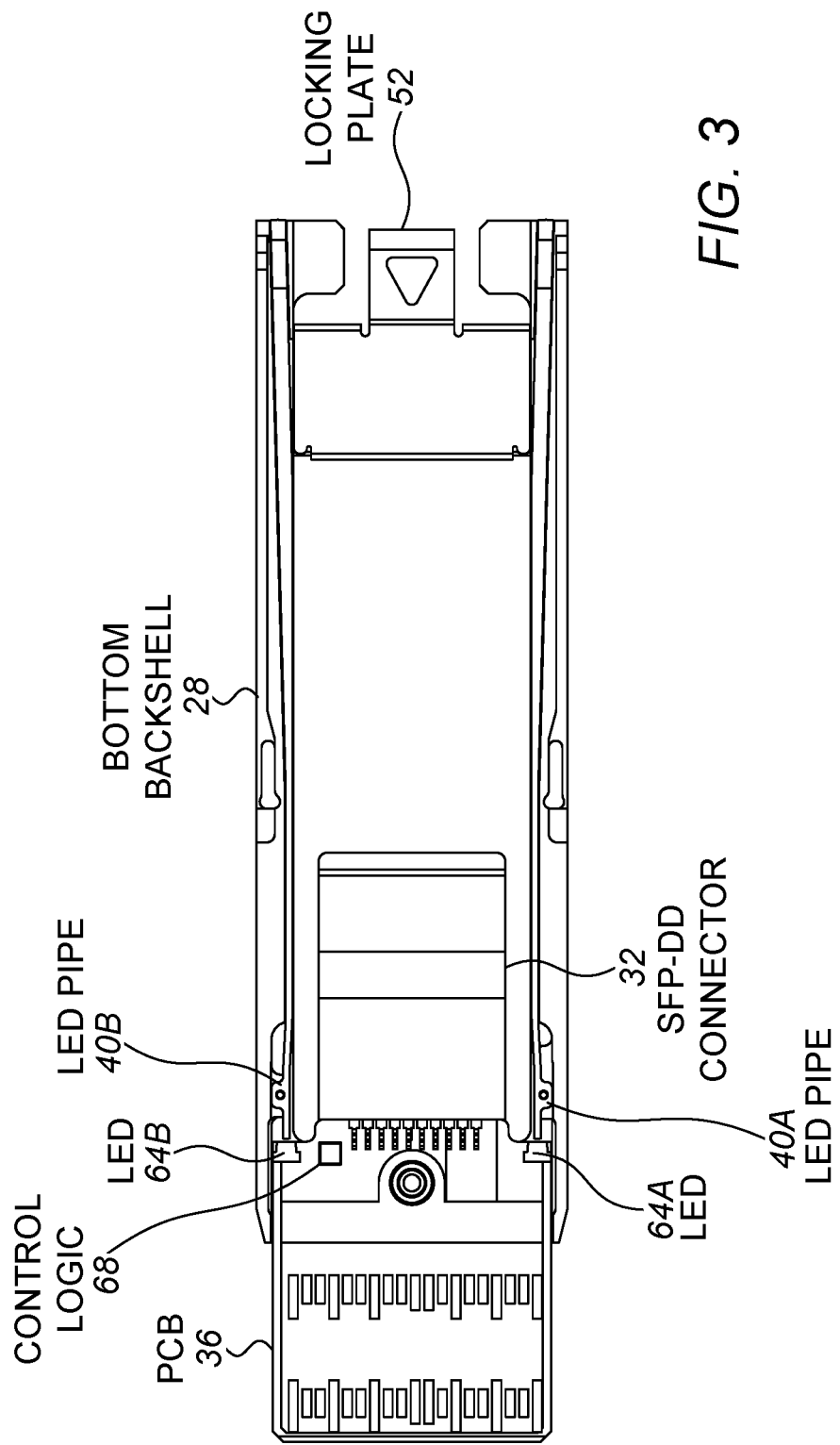
FIG. 3 is a bottom view of the QSFP-DD to SFP-DD adapter, in accordance with an embodiment of the present invention.

FIG. 3 is a bottom view of QSFP-DD to SFP-DD adapter 20, in accordance with an embodiment of the present invention. The bottom view show two LEDs 64A and 64B, which are mounted on PCB 36 and are coupled respectively to LED pipes 40A and 40B. FIG. 3 also shows circuit traces on PCB 36 that make-up the electrical connections of the male QSFP-DD connector.

Also seen in this figure is a control logic circuit 68, which is part of the electronic circuit on PCB 36. In various embodiments, logic circuit 68 performs tasks such as selecting the two signal lanes to be routed to connector 32, and/or receiving status information and driving LEDs 64A and 64B accordingly.

In one example embodiment, each of LEDs 64A and 64B is a dual-color LED that can be illuminated in green or amber. In this embodiment, logic circuit 68 may drive each LED using the following coding:

| Green | Amber | Functionality |
|---|---|---|
| Off | Off | No power |
| On | Off | Physical link is up |
| Blinking | Off | Physical link error |
| Off | On | Logical link is up |
| Off | Blinking | Data traffic is active |

The coding scheme in the table above is depicted purely by way of example. In alternative embodiments, any other suitable coding scheme can be used.

In some embodiments, circuit 68 may perform other tasks in addition to lane selection and LED control, for example on-board device management, identification, or other suitable functions. In some embodiments circuit 68 comprises a microcontroller that performs at least some of these tasks.

In some embodiments, logic circuit 68 receives (possibly in addition to other information) status information for the ports mapped to the two SFP-DD lanes selected for routing, and drives LEDs 64A and 64B to visualize the status information. In one embodiment, logic circuit 68 receives the status information from the server at the distant end of the cable. In another embodiment, logic circuit 68 receives the status information autonomously by sensing the signals on the two SFP-DD lanes.

In some embodiments, the selection of two SFP-DD lanes from among the eight QSFP-DD lanes is fixed per adapter (e.g., hard-wired, or pre-programmed in a way that cannot be changed by a user). In such embodiments, different adapters can be produced with different selected lanes. In other words, different adapters may differ from one another in the identities of the selected SFP-DD lanes, but the selection is fixed per individual adapter.

In alternative embodiments, the selection of the two SFP-DD lanes from among the eight QSFP-DD lanes is configurable by the user in each adapter. For example, the adapter may comprise a suitable high-speed selector, multiplexer, aggregator or switch (not shown in the figures) that enables the user to dynamically choose the desired pair of lanes. Alternatively, any other possible method of configuring the pair of SFP-DD lanes can be used.

The configuration of adapter 20 shown in FIGS. 1-3 is an example configuration that is chosen purely for the sake of conceptual clarity. In alternative embodiments, adapters having any other suitable mechanical and/or electrical configurations can be used. In addition to printed circuit traces, the electronic circuit on PCB 36 may comprise, for example, one or more discrete components, one or more Integrated Circuits (ICs), one or more programmable logic devices such as Field-Programmable Gate Array (FPGA), one or more microcontrollers, one or more Erasable Programmable Read Only Memory (EPROM) devices, and/or any other suitable type of hardware.

Although the embodiments described herein mainly address QSFP-DD to SFP-DD adapters, the methods and systems described herein can also be used in other applications, such as in converting between other types of transceiver form factors. Generally put, such an adapter may comprise (i) an electrical male connector configured for plugging into a receptacle of a first electro-optical transceiver type having N signal lanes, (ii) an electrical female connector configured to receive a male connector of a second electro-optical transceiver type having M signal lanes, M smaller than N, and (iii) an electronic circuit, configured to route a partial subset of M signal lanes from among the N signal lanes between the electrical male connector and the electrical female connector.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An adapter, comprising:
   an electrical male connector, configured for plugging into a receptacle of a first electro-optical transceiver type having N signal lanes;
   an electrical female connector, configured to receive a male connector of a second electro-optical transceiver type having M signal lanes, M smaller than N; and
   a user-configurable component that is configured to receive from a user a choice of a partial subset of M signal lanes selected by the user from among the N signal lanes, and to route the partial subset selected by the user between the electrical male connector and the electrical female connector.

2. The adapter according to claim 1, wherein the first electro-optical transceiver type comprises Quad Small Form Factor Pluggable Double Density (QSFP-DD), and wherein the second electro-optical transceiver type comprises Small Form Factor Pluggable Double Density (SFP-DD).

3. The adapter according to claim 1, and comprising a mechanical shell that contains the male connector, the female connector and the electronic circuit.

4. The adapter according to claim 1, and comprising one or more visual indicators, configured to display a status of one or more network ports mapped to one or more of the signal lanes in the partial subset.

5. A method for producing an adapter, the method comprising:
   providing an electrical male connector, configured for plugging into a receptacle of a first electro-optical transceiver type having N signal lanes;
   providing an electrical female connector, configured to receive a male connector of a second electro-optical transceiver type having M signal lanes, M smaller than N; and
   connecting the electrical male connector and the electrical female connector to a user-configurable component that is configured to receive from a user a choice of a partial subset of M signal lanes selected by the user from among the N signal lanes, and to route the partial subset selected by the user between the electrical male connector and the electrical female connector.

6. The adapter according to claim 1, wherein the user-configurable component comprises a selector, a multiplexer, an aggregator or a switch.

7. An adapter set, comprising:
   a plurality of adapters, each adapter comprising:
      an electrical male connector, configured for plugging into a receptacle of a first electro-optical transceiver type having N signal lanes;
      an electrical female connector, configured to receive a male connector of a second electro-optical transceiver type having M signal lanes, M smaller than N; and
      an electronic circuit, configured to select, from among the N signal lanes, a selected partial subset of M signal lanes, and to route the selected partial subset between the electrical male connector and the electrical female connector,
   wherein the adapters in the plurality differ from one another in the selected partial subset of M signal lanes.

8. The adapter set according to claim 7, wherein the first electro-optical transceiver type comprises Quad Small Form Factor Pluggable Double Density (QSFP-DD), and wherein the second electro-optical transceiver type comprises Small Form Factor Pluggable Double Density (SFP-DD).

9. The adapter set according to claim 8, wherein the partial subset consists of two SFP-DD signal lanes, and comprising two visual indicators configured to display a status of two network ports mapped to the two SFP-DD signal lanes, respectively.

10. The adapter set according to claim 7, wherein each adapter comprises a mechanical shell that contains the male connector, the female connector and the electronic circuit.

11. A method for producing an adapter set, the method comprising:

for each adapter in a plurality of adapters:
providing an electrical male connector, configured for plugging into a receptacle of a first electro-optical transceiver type having N signal lanes;
providing an electrical female connector, configured to receive a male connector of a second electro-optical transceiver type having M signal lanes, M smaller than N; and
connecting the electrical male connector and the electrical female connector by an electronic circuit, configured to route a partial subset of M signal lanes from among the N signal lanes, between the electrical male connector and the electrical female connector,
wherein the adapters in the plurality differ from one another in the selected partial subset of M signal lanes.

* * * * *